US012746732B1

(12) United States Patent
van der Ouderaa et al.

(10) Patent No.: US 12,746,732 B1
(45) Date of Patent: Sep. 29, 2026

(54) SYSTEM AND METHOD FOR DIESEL EMISSION CONTROL DEVICE CORE INSERTION AND REMOVAL

(71) Applicant: Dinex A/S, Middlefart (DK)

(72) Inventors: Rogier van der Ouderaa, Comberbach (GB); Gowtheeshwaran Manickam, Ammapet (IN)

(73) Assignee: Dinex A/S, Middlefart (DK)

( * ) Notice: Subject to any disclaimer, the term of this patent is extended or adjusted under 35 U.S.C. 154(b) by 0 days.

(21) Appl. No.: 19/531,126

(22) Filed: Feb. 5, 2026

(30) Foreign Application Priority Data

Nov. 25, 2025 (IN) .............................. 202511116836

(51) Int. Cl.
*B30B 15/00* (2006.01)

(52) U.S. Cl.
CPC ................................ *B30B 15/0052* (2013.01)

(58) Field of Classification Search
CPC .................................................. B30B 15/0052
See application file for complete search history.

(56) References Cited

U.S. PATENT DOCUMENTS 5,724,735 A 3/1998 Ickes et al.
6,162,404 A 12/2000 Tojo et al.
6,242,071 B1 6/2001 Yamada et al.
6,532,659 B1 3/2003 DeSousa et al.
6,732,432 B2 5/2004 Foster et al.
7,111,392 B2 9/2006 Irie et al.
7,174,635 B2 2/2007 Irie et al.
7,200,910 B2 4/2007 Kasten et al.
7,743,501 B2 6/2010 Kotrba et al.
7,803,447 B2 9/2010 Kondo et al.
8,146,251 B2 4/2012 Kobayashi et al.
8,590,152 B2 11/2013 Cantele et al.
8,661,671 B2 3/2014 Hill, Jr.
8,661,672 B2 3/2014 Cantele et al.
12,048,920 B2 7/2024 VanPatten et al.
2007/0048198 A1 3/2007 Terres
2009/0193643 A1 8/2009 Sano et al.
(Continued)

FOREIGN PATENT DOCUMENTS

DE 102013200869 A1 7/2014
DE 102008005752 B4 6/2017
(Continued)

*Primary Examiner* — Nirvana Deonauth
(74) *Attorney, Agent, or Firm* — Meunier Carlin & Curfman LLC

(57) ABSTRACT

A system for assembling or disassembling a diesel emission control device includes a press station comprising a piston engageable with a moving platform along a longitudinal axis of the press station. A contact plate on a first side of the moving platform is configured to engage with a first end of the sleeve An alignment tool is coupled to a second side of the moving platform. The alignment tool includes an inner surface defining a central channel having a minimum diameter. The alignment tool is configured to support and engage with a second end of the sleeve. A core platform configured to support the core, the core platform having a diameter less than the minimum diameter of the central channel of the alignment tool. Engagement of the piston with the moving platform forces the core through the central channel of the alignment tool and into the sleeve.

13 Claims, 12 Drawing Sheets

(56) References Cited

U.S. PATENT DOCUMENTS

| | | | | |
|---|---|---|---|---|
| 2023/0019521 | A1 * | 1/2023 | VanPatten | B01J 37/0009 |
| 2024/0359171 | A1 | 10/2024 | VanPatten et al. | |

FOREIGN PATENT DOCUMENTS

| | | | |
|---|---|---|---|
| EP | 3914813 | B1 | 3/2024 |
| JP | 57173516 | A2 | 10/1982 |
| WO | 9932215 | A1 | 7/1999 |

* cited by examiner

SYSTEM AND METHOD FOR DIESEL EMISSION CONTROL DEVICE CORE INSERTION AND REMOVAL

CROSS-REFERENCE TO RELATED APPLICATIONS

This application claims priority to and the benefit of Indian Patent Application No. 202511116836, filed Nov. 25, 2025, the entire contents of which are incorporated herein by reference.

BACKGROUND

Diesel emission control devices (DECD), such as diesel oxidation catalysts (DOCs) and diesel particulate filters (DPFs), are used to reduce pollutants in exhaust gases from diesel engines. These devices typically include a core, matting, and sleeve (or canning) arranged concentrically within a housing that forms part of the exhaust line.

When assembling a diesel emission control device (DECD), the core (which may include matting) and the sleeve are separate from each other until the core is forced into the sleeve. However, such an assembly process is subject to misalignment and may damage the core and its material, reducing viability of the DECD. When disassembling a DECD, the core is forced out of the sleeve (e.g., during a re-coring process or to fix a manufacturing error). However, such a disassembly process is subject to misalignment and may damage the core and/or the sleeve.

Therefore, a need exists for improved assembly and disassembly of a diesel emission control device.

SUMMARY

One implementation relates to a system for installing a sleeve onto a core of a diesel emission control device (DECD). The system includes a press station, a contact plate, an alignment tool, and a core platform. The press station includes a piston engageable with a moving platform along a longitudinal axis of the press station. The contact plate is on a first portion of the moving platform. The contact plate includes a contact surface configured to engage with a first end of the sleeve. The alignment tool is coupled to a second portion of the moving platform. The alignment tool includes an inner surface defining a central channel having a minimum diameter. The alignment tool is configured to support and engage with a second end of the sleeve. The core platform is configured to support the core. The core platform is spaced apart from the moving platform along the longitudinal axis and has a diameter less than the minimum diameter of the central channel of the alignment tool. Engagement of the piston with the moving platform forces the core through the central channel of the alignment tool and into the sleeve.

In some implementations, the press station further includes a frame along with the moving platform is slidably engaged.

In some implementations, the core platform is rigidly supported by the frame.

In some implementations, the system further includes a hydraulic power system in communication with the press station, the hydraulic power system being configured to activate or deactivate the piston to move the moving platform in a longitudinal direction.

In some implementations, the hydraulic power system further includes a controller and a user interface for controlling activation of the piston.

In some implementations, the alignment tool includes: a first end and a second end opposite from the first end along a longitudinal axis of the alignment tool, the first end including a first opening of the central channel and the second end including a second opening of the central channel; and a funnel forming a portion of the central channel that is defined by the inner surface, the funnel extending from the second opening along a portion of the inner surface that narrows radially towards the first opening.

In some implementations, movement of the piston and the moving platform forces the core through the second opening of the central channel of the alignment tool and towards the first opening of the central channel, wherein the core is longitudinally aligned with the sleeve via the funnel of the central channel.

In some implementations, the core and the core platform remain longitudinally stationary during installation of the sleeve onto the core, while the sleeve and the alignment tool are moved between an initial position and an installed position longitudinally spaced apart from the initial position.

In some implementations, the second portion of the moving platform defines an opening within which the alignment tool is disposed, the alignment tool further including a flange disposed on the first end of the alignment tool, the flange configured to engage with the second portion of the moving platform to support the alignment tool.

In some implementations, the alignment tool includes: an annular support surface configured to support the second end of the sleeve, wherein the annular support surface is a shoulder defined along the inner surface.

According to another implementation, a method of installing a sleeve onto a core of a diesel emission control device (DECD) is disclosed. The method includes provide the system for installing a sleeve onto a core of a diesel emission control device (DECD). The method further includes placing the core on the core platform. The method further includes placing the sleeve on the alignment tool between the contact plate and the alignment tool. The method further includes activating the piston to move the moving platform from an initial position longitudinally towards the core platform, wherein the core is forced through the central channel of the alignment tool and the sleeve is disposed around the core.

In some implementations, the system further includes a frame, wherein moving the moving platform towards the core platform includes sliding the moving platform longitudinally along the frame.

In some implementations, the method further includes deactivating the press station when the sleeve is positioned on the core or when the moving platform reaches a stopping point.

In some implementations, moving the moving platform towards the core includes aligning the sleeve and the core longitudinally via a funnel of the central channel of the alignment tool.

In some implementations, the core and the core platform remain longitudinally stationary during installation of the sleeve onto the core, while the sleeve and the alignment tool are moved between the initial position and an installed position longitudinally spaced apart from the initial position.

According to another implementation, a system for removing a sleeve from a core of a diesel emission control device (DECD) is disclosed. The system includes a press station, a removal tool, and a core platform. The press station includes a piston engageable with a moving platform along a longitudinal axis of the press station. The moving platform includes a first portion and a second portion spaced apart longitudinally from the first portion. The second portion of the moving platform defines an opening. The removal tool is coupled to the moving platform. The removal tool includes an annular body extending through the opening of the second portion of the moving platform and a flange extending radially outwardly from a first end of the removal tool. The annular body includes an inner surface defining a central channel extending from the first end to a second end of the removal tool. The central channel has a channel diameter equal to an inner diameter of the sleeve. The core platform is configured to support the core, the core platform being spaced apart from the moving platform along the longitudinal axis and having a diameter less than the channel diameter of the central channel of the removal tool. Engagement of the piston with the moving platform forces the second end of the removal tool to engage with the sleeve, removing the sleeve from the core.

In some implementations, the press station further includes a frame along with the moving platform is slidably engaged, wherein the core platform is rigidly supported by the frame.

In some implementations, the system further includes a hydraulic power system in communication with the press station, the hydraulic power system being configured to activate or deactivate the piston to move the moving platform in a longitudinal direction.

In some implementations, the hydraulic power system further includes a controller and a user interface for controlling activation of the piston.

In some implementations, movement of the piston and the moving platform forces the core through the central channel of the removal tool until the core is free from the sleeve and the sleeve is dispose around the core platform.

In some implementations, the core and the core platform remain longitudinally stationary during removal of the sleeve from the core, while the removal tool is moved between an initial position and a second position longitudinally spaced apart from the initial position.

In some implementations, when the sleeve is removed from the core, a matting is removed from the core as well.

In some implementations, a method of removing a sleeve from a core of a diesel emission control device (DECD) is disclosed. The method includes providing the system for removing a sleeve from a core of a diesel emission control device (DECD). The method further includes placing the diesel emission control device on the core platform. The method further includes activating the piston to move the moving platform from an initial position longitudinally towards the core platform. The removal tool engages with the sleeve to force the sleeve to move longitudinally relative to the core, wherein the core is forced through the central channel of the removal tool.

In some implementations, the method further includes deactivating the press station when the sleeve is disposed around the core platform or when the moving platform reaches a stopping point.

In some implementations, the method further includes removing the core from the core platform; moving the moving platform from a second position to the initial position; and removing the sleeve from the press station.

This summary is illustrative only and is not intended to be in any way limiting. Other aspects, features, and advantages of the devices or processes described herein will become apparent in the detailed description set forth herein, taken in conjunction with the accompanying figures, wherein like reference numerals refer to like elements.

BRIEF DESCRIPTION OF DRAWINGS

The systems, methods, and devices are explained in even greater detail in the following drawings. The drawings are merely exemplary, and certain features may be used singularly or in combination with other features. The drawings are not necessarily drawn to scale.

DETAILED DESCRIPTION

Figure 1A:
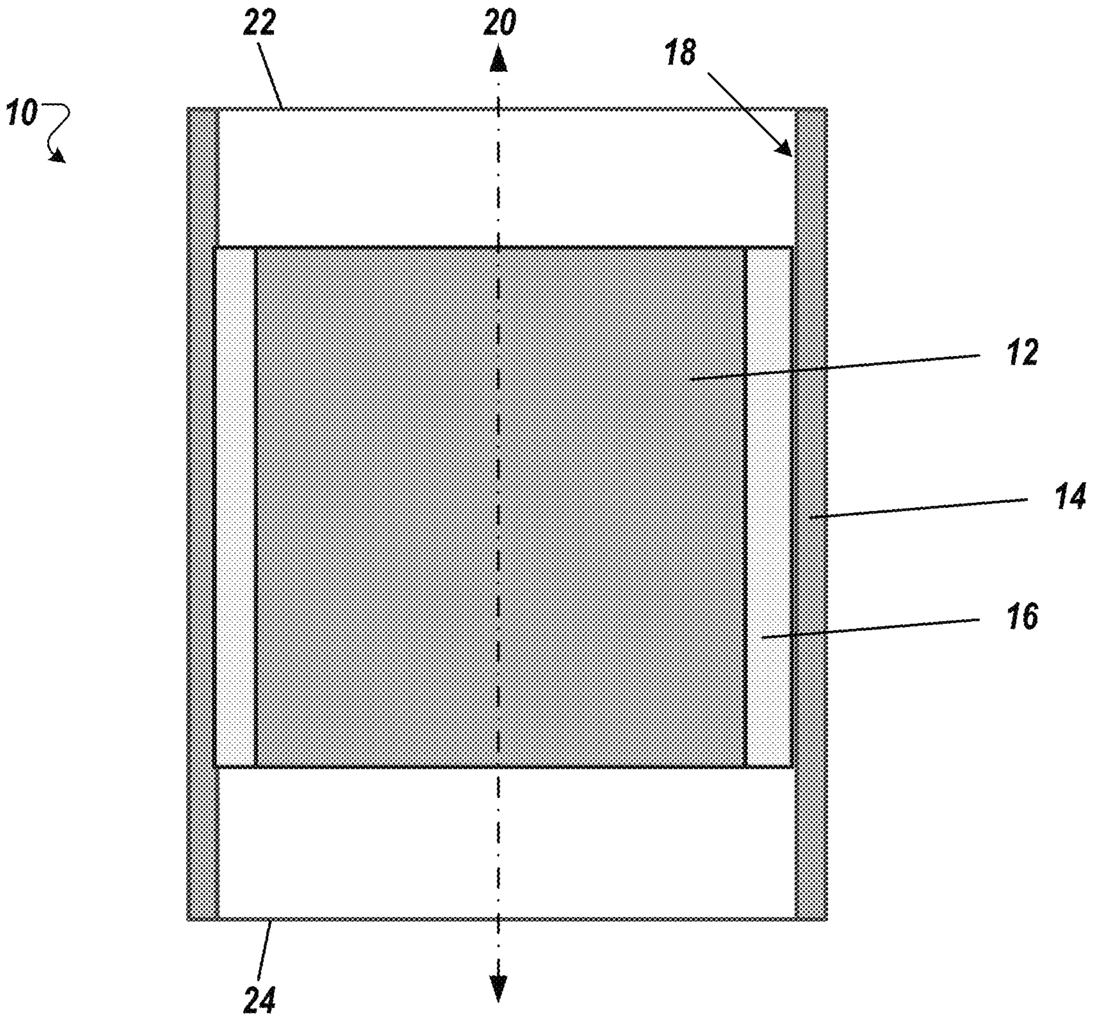
FIG. 1A is a cross-sectional view of a diesel emission control device (DECD), according to one implementation.

Following below are more detailed descriptions of concepts related to, and implementations of, methods, apparatuses, and systems for diesel emission control devices (DECD) including their assembly and disassembly. The figures illustrate exemplary implementations in detail, and the present disclosure is not limited to the details or methodology set forth in the description or illustrated in the figures. The terminology used herein is for the purpose of description only and should not be regarded as limiting.

Diesel emission control devices (DECD), such as diesel oxidation catalysts (DOCs) and diesel particulate filters (DPFs), are used to reduce pollutants in exhaust gases from diesel engines. These devices typically include a core, matting, and sleeve (or canning) arranged concentrically within a housing that forms part of the exhaust line.

The core is the functional element of the device, which is often a monolithic substrate (e.g., ceramic, silicon carbide, metal, or other materials). The substrate includes a porous structure and/or series of flow channels coated with a catalyst configured to trap soot particles in an exhaust gas. The core further includes matting disposed around the core. The matting (e.g., a ceramic fiber-based material) provides thermal insulation, cushions against mechanical vibration, and maintains the core in position under varying temperature and pressure conditions. The sleeve, or metal shell, encases the matting and the core. The sleeve provides structural containment for the DECD, forming the interface to the exhaust piping or other aspects of the exhaust treatment system.

Assembly of a DECD generally involves wrapping the core with the matting material and inserting the wrapped core into the sleeve using a canning process. The sleeve may be welded, crimped, or otherwise sealed to form a gas-tight enclosure around the core. This assembly is then integrated into the vehicle's exhaust system via welded or flanged joints.

Core removal is conducted, for example, during inspection, failure analysis, or remanufacturing. Removal typically involves cutting or separating the sleeve along a weld seam or joint, followed by extraction of the matting and core. Core removal must be performed carefully to avoid damaging the substrate, which is often brittle.

Various implementations include an improved system for installing a sleeve onto a core to assemble a diesel emission control device (DECD). In some implementations, an alignment tool is provided to facilitate assembly. Various implementations provide a system with an alignment tool that is configured to properly align a core and a sleeve of a DECD during assembly without undue damage to the components thereof.

Various implementations include an improved system for removing the sleeve from the core of a DECD. In some implementations, a removal tool is provided to facilitate disassembly of the sleeve and core. Various implementations provide a system with a removal tool configured to properly align with and remove the sleeve from the DECD without undue damage to the components thereof.

FIG. 1A shows a diesel emission control device (DECD) 10, according to one implementation. The DECD 10 includes a core 12 disposed within a sleeve 14. Additionally, a layer of matting 16 is disposed between the core 12 and the inner surface of the sleeve 14. In FIG. 1A, the core 12 is disposed within a channel defined by the sleeve 14. In particular, an inner surface 18 of the sleeve 14 defines the channel within which the core 12 is disposed. The sleeve 14 extends from a first end 22 to a second end 24 opposite and spaced apart from the first end 22 along a longitudinal axis 20 of the sleeve 14. When assembled, a longitudinal axis of the core 12 is coaxial with the longitudinal axis 20 of the sleeve 14.

Figure 1B:
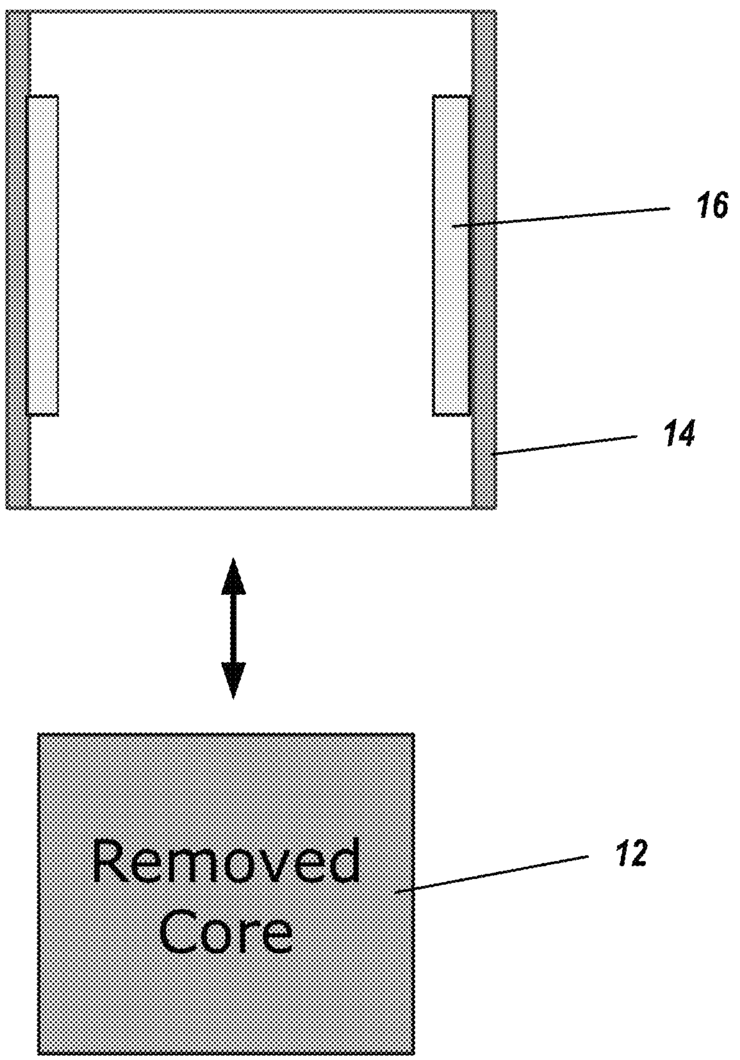
FIG. 1B shows the DECD of FIG. 1A in a disassembled state, according to one implementation.

FIG. 1B shows a diagram of the DECD 10 wherein the core 12 is removed from the channel of the sleeve 14, as further described herein.

Figure 2:
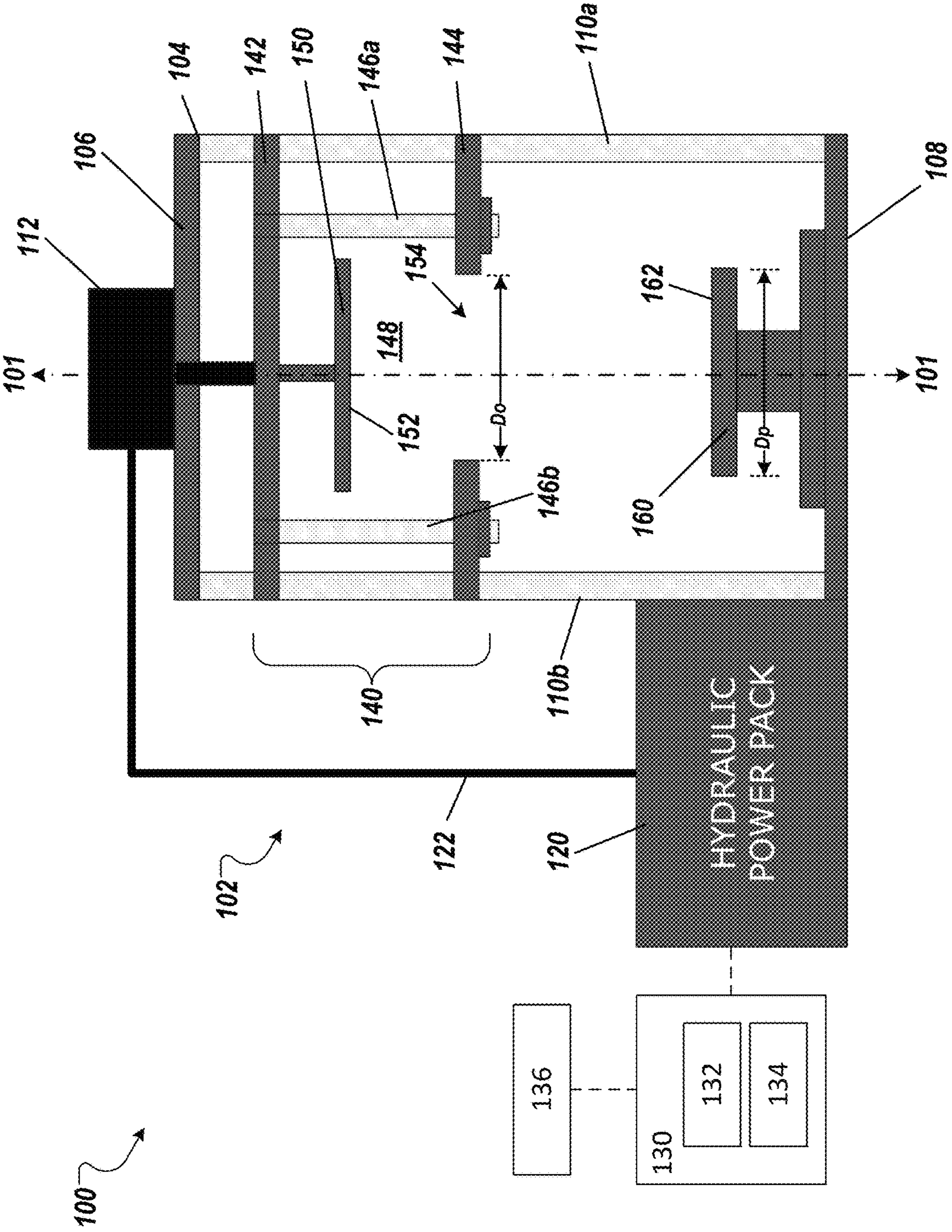
FIG. 2 shows a system for assembling or disassembling a DECD, according to one implementation.

FIG. 2 shows a system 100, according to one implementation. The system 100 is configured to install a sleeve onto a core of a diesel emission control device (e.g., install the sleeve 14 of FIG. 1A onto the core 12). The system 100 is also configured to remove a sleeve from a core of a DECD (e.g., remove the sleeve 14 of FIG. 1B from the core 12), as further described herein.

The system 100 includes a press station 102, a hydraulic power system 120, a moving platform 140, and a core platform 160. The press station 102 includes a frame 104 and a piston 112. The frame 104 is arranged along a longitudinal axis 101. The frame 104 extends from a first end 106 to a second end 108 spaced apart from the first end 106 along the longitudinal axis 101. The frame 104 includes frame members 110*a*, 110*b* extending from the first end 106 to the second end 108. Although only two vertical frame members are shown in the frame of FIG. 2, in other implementations the frame includes a plurality of vertical, horizontal, and/or diagonal frame members (e.g., forming a rectangular frame). The piston 112 is coupled to the frame 104 on the first end 106.

The hydraulic power system 120 is adjacent to the frame 104, as shown in FIG. 2. The hydraulic power system 120 includes a hydraulic line 122 in fluid communication with the piston 112. The piston 112 is selectively engageable by the hydraulic power system 120. The piston 112 can be activated to move along the longitudinal axis 101 of the frame 104. For example, the piston 112 can be activated to move a desired distance or for a desired amount of time. The piston 112 can also be selectively deactivated by the hydraulic power system 120. In other implementations, a plunger, linear actuator, or other activated extension device is provided in place of, or in conjunction with, the hydraulic piston.

The hydraulic power system 120 further includes and/or is coupled to a controller 130. The controller 130 includes a processor 132 and a memory 134. The memory 134 may include instructions stored thereon to be executed by the processor 132. For example, the memory 134 may include instructions for the processor 132 to activate or deactivate the hydraulic power system 120 to move the piston 112. The system 100 further includes a user interface 136 operatively coupled to the controller 130. The user interface 136 is configured to receive and transmit user inputs to the controller 130. The user interface 136 may include one or more buttons and/or a screen or other device for displaying information and/or receiving inputs. For example, the user interface may have a start and stop button, or directional buttons, for activating the hydraulic power system 120 and the piston 112 thereof.

The moving platform 140 is coupled to the press station 102. The moving platform 140 is generally disposed near the first end 106 of the frame 104. The moving platform 140 is movably coupled (e.g., slidably coupled) to the frame members 110*a*, 110*b* of the frame 104. The moving platform 140 is movable along the frame 104 in a longitudinal direction (e.g., parallel to the longitudinal axis 101) towards, or away from, the second end 108 of the frame 104. As shown in FIG. 2, the longitudinal axis 101 and the longitudinal movement of the moving platform 140 may be "upwards" or "downwards." However, it is understood that reference to a direction (e.g., up, down, left, or right) refers only to the orientation shown in the figures for ease of description, and such language does not limit the disclosure.

The moving platform 140 includes a first side, or "upper side", and a second side, or "lower side", longitudinally spaced apart from the first side. The first side of the moving platform 140 is closer to the first end 106 of the second end 108 of the frame 104, and the first side includes a first portion 142. The second side of the moving platform 140 is closer to the second end 108 of the frame 104, and the second side includes a second portion 144. The second portion 144 is spaced apart from the first portion 142 to define a space 148 of the moving platform 140.

The first portion 142 and the second portion 144 are both structural members and/or plates extending across the frame 104 from the frame member 110*a* to the frame member 110*b*. For example, each portion may include two or more cross members supporting a plate. The first and second portions 142, 144 are coupled together such that they move together along the frame 104. Connectors 146*a*, 146*b* extend between and are coupled to each of the first portion 142 and the second portion 144 of the moving platform 140. The piston 112 is coupled to the first portion 142 of the moving platform 140, as shown in FIG. 2. Thus, the piston 112 and the hydraulic power system 120 can control (e.g., activate or deactivate) movement of the moving platform 140 along the frame 104.

The first portion 142 of the moving platform 140 further includes a contact plate 150 extending into the space 148 from the first portion 142 towards the second portion 144. The contact plate 150 includes a contact surface 152 extending substantially parallel to both the first portion 142 and the second portion 144 of the moving platform 140. The contact surface 152 is spaced apart from the first portion 142. The contact surface 152 is also spaced apart from the second portion 144. However, in other implementations, the contact surface coincides with the first portion. In other implementations, the contact surface is an extension of the piston extending through the first portion. The contact surface 152 is configured to engage with the first end 22 of the sleeve 14 as further described herein.

The second portion 144 of the moving platform 140 defines an opening 154 aligned with the longitudinal axis 101 of the press station 102. The opening 154 has a circular shape; however, in other implementations, the opening has a different shape (e.g., square or rectangular). The opening 154 is also longitudinally aligned with the contact surface 152 of the contact plate 150. The opening 154 on the second portion 144 is configured to receive and support a tool for facilitating sleeve removal or insertion as further described herein. As shown in FIG. 2, the opening 154 has an opening diameter "Do" measured across the second portion 144, perpendicular to the longitudinal axis 101.

The core platform 160 is longitudinally aligned with the moving platform 140. The core platform 160 is rigidly coupled to the second end 108 of the frame 104 of the press station 102. In some implementations, the core platform is removably coupled and/or adjustable to a different height or location on the press station.

The core platform 160 includes a core platform surface 162 configured to support the core 12 of the DECD 10. The core platform 160 and the core platform surface 162 are spaced apart from the moving platform 140 when the moving platform 140 is in an initial position. The core platform 160 has a core platform diameter measured perpendicular to the longitudinal axis 101, shown as "Dp" in FIG. 2. The core platform diameter is less than the opening diameter of the opening 154 such that, when the moving platform 140 is moved to a second position, the core platform 160 can pass through the opening 154 of the second portion 144 of the moving platform 140.

Assembly and Insertion

Figure 3A:
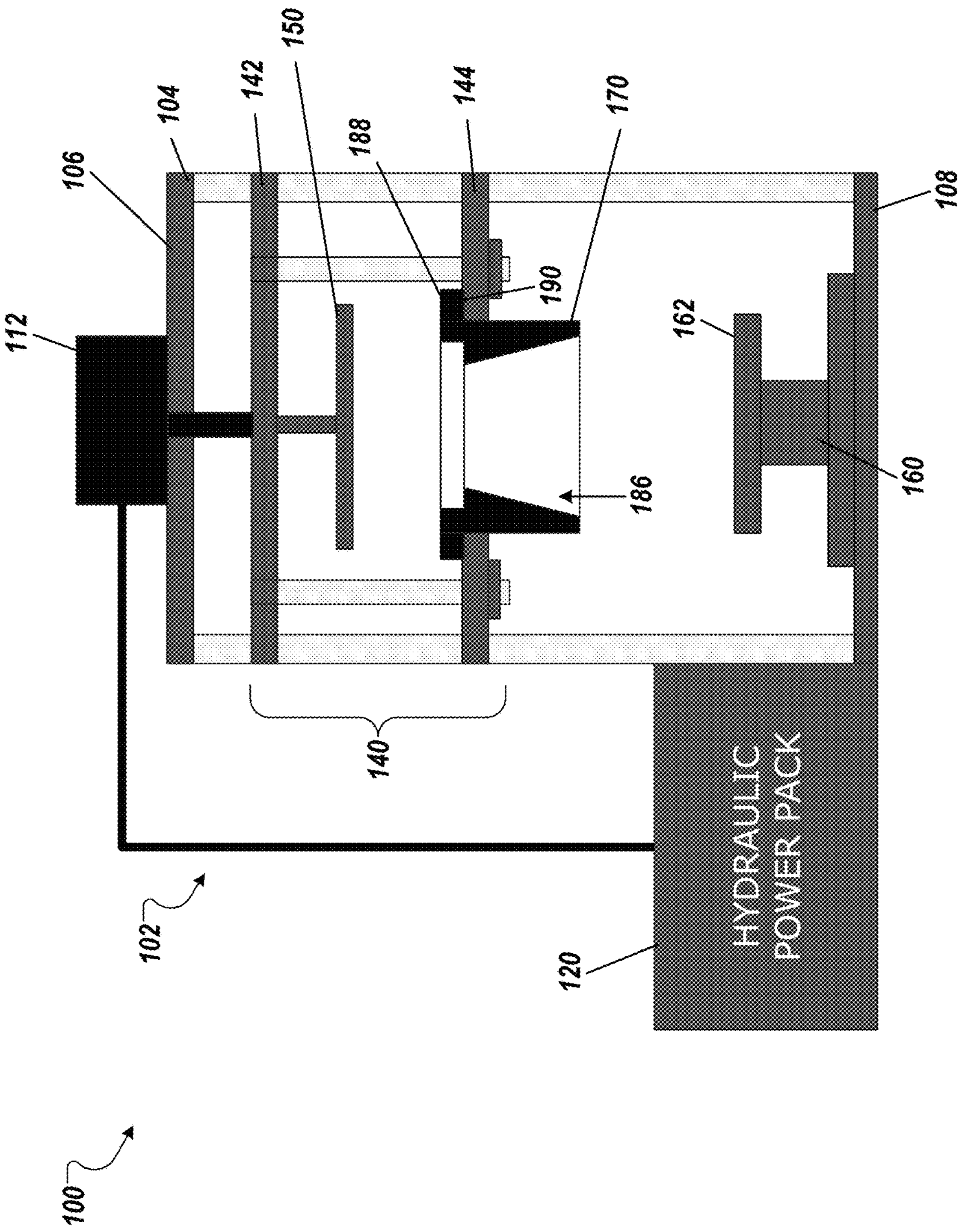
FIG. 3A shows the system of FIG. 2 with an alignment tool, wherein the system is configured for installing a sleeve onto a core of a DECD, according to one implementation.
Figure 3B:
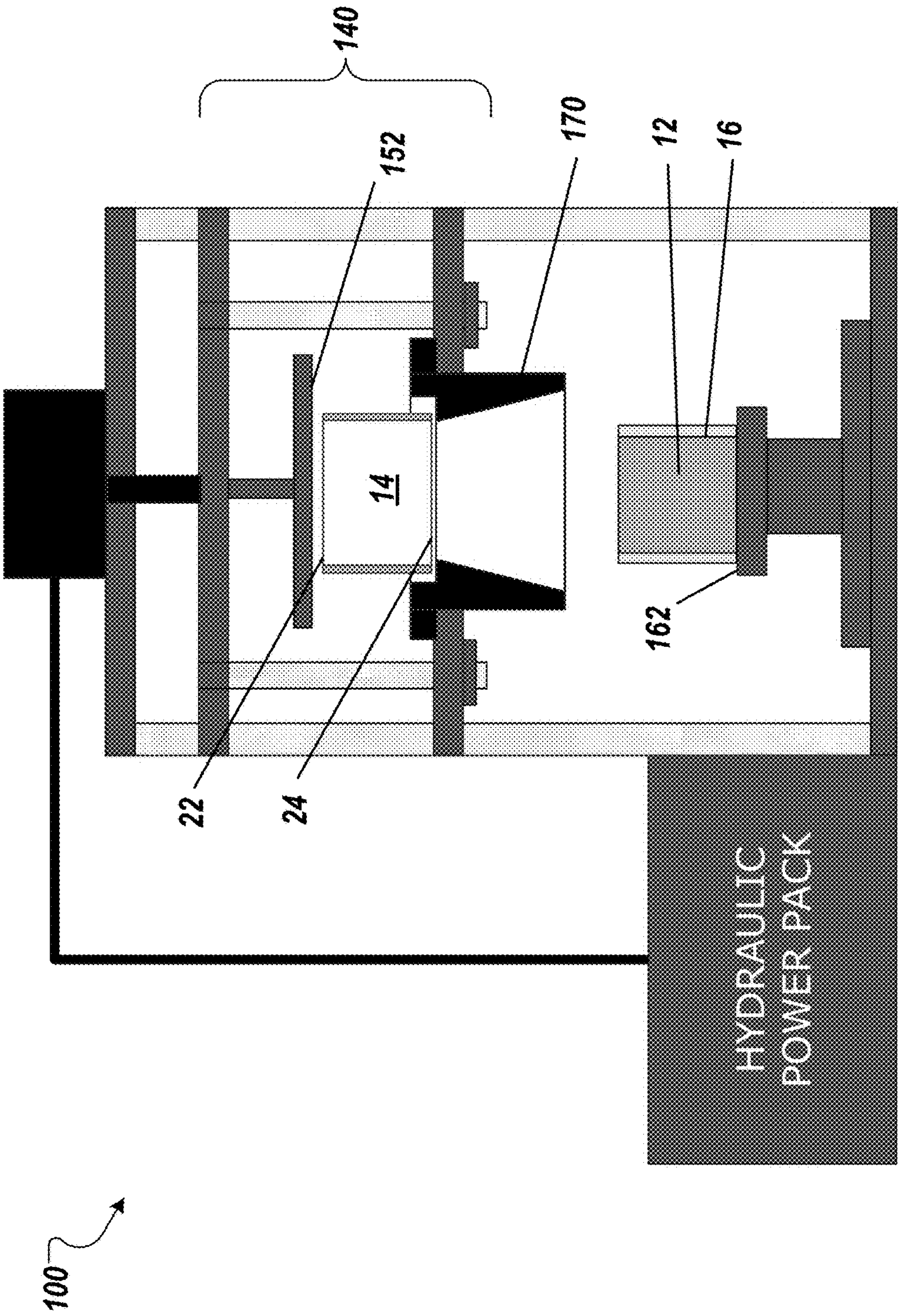
FIG. 3B shows the system of FIG. 3A with the sleeve and the core in place for assembly.
Figure 3C:
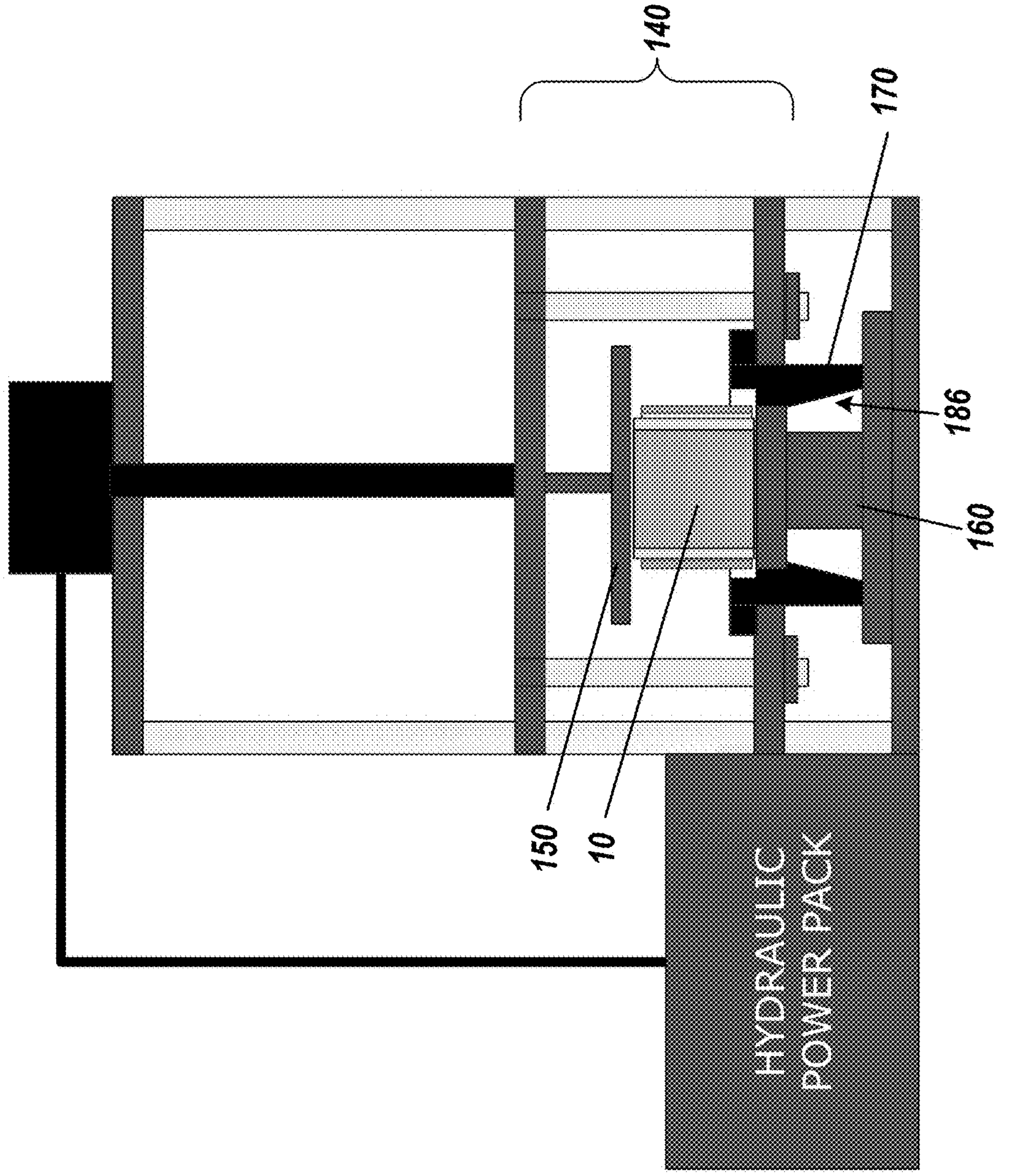
FIG. 3C shows the system of FIG. 3A with the sleeve installed on the core.

FIGS. 3A-3C show an assembly process for the DECD 10 wherein the sleeve 14 is installed onto the core 12 having an outer matting 16. To facilitate the assembly process, the system 100 includes an alignment tool 170, which is shown in further detail in FIG. 4. As shown in FIG. 3A, the alignment tool 170 is couplable to the moving platform 140. In particular, the alignment tool 170 is couplable to the second portion 144 of the moving platform 140 such that a portion of the alignment tool 170 extends through the opening 154 of the second portion 144. In some implementations, the system includes one or more fasteners to couple the alignment tool to the second portion of the moving platform (e.g., screws, bolts, or spring-loaded tabs).

Figure 4:
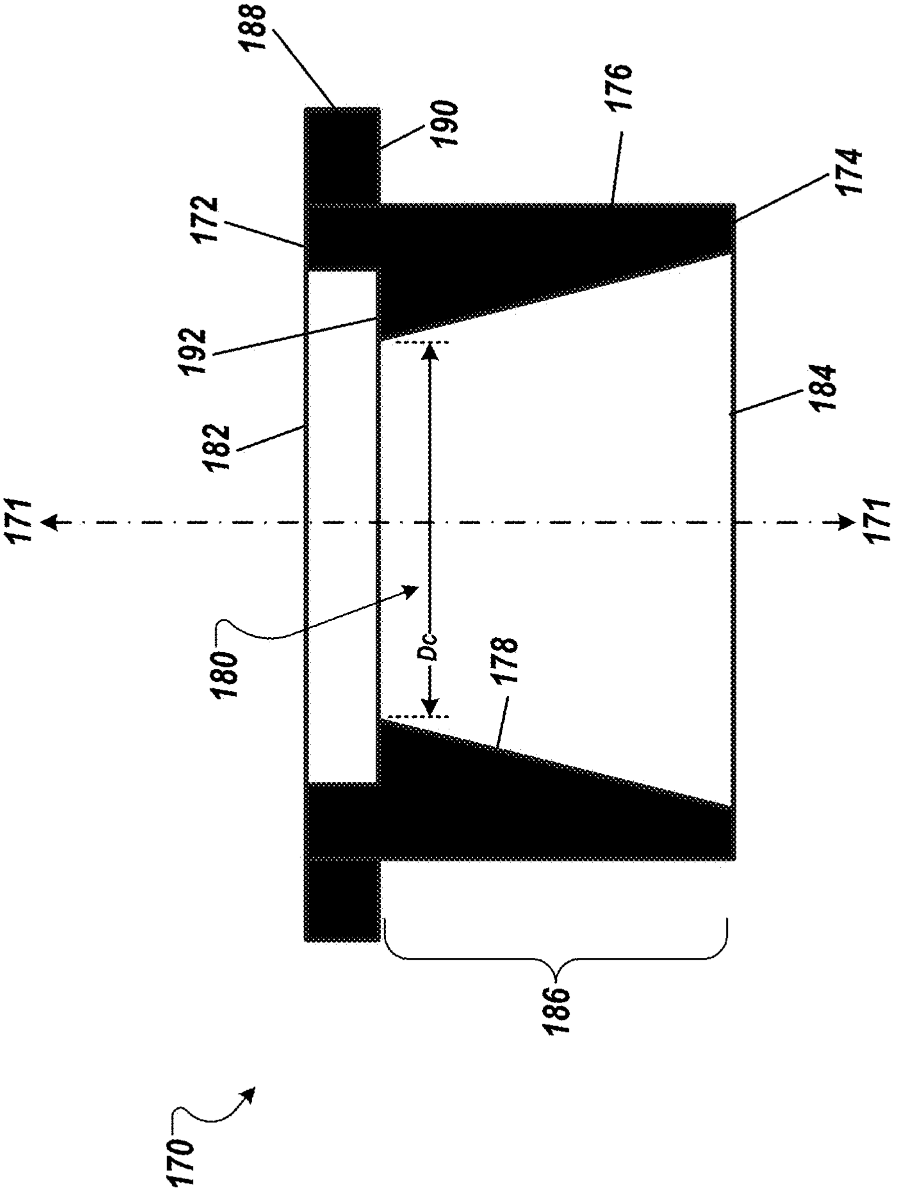
FIG. 4 shows a cross-sectional view of the alignment tool in FIG. 3A.

As shown in FIG. 4, the alignment tool 170 includes a first end 172 and a second end 174 opposite and spaced apart from the first end 172 along a longitudinal axis 171 of the alignment tool 170. When the alignment tool 170 is coupled to the moving platform 140, the longitudinal axis 171 of the alignment tool 170 is coaxial (or at least parallel to) the longitudinal axis 101 of the press station 102.

The alignment tool 170 includes an outer surface 176 and an inner surface 178 radially spaced apart from the outer surface 176. The inner surface 178 defines a central channel 180 of the alignment tool 170. The central channel 180 extends from a first opening 182 on the first end 172 to a second opening 184 on a second end 174 of the alignment tool 170. The central channel 180 includes a minimum diameter, shown "Dc" in FIG. 4, that is less than the core platform diameter Dp of the core platform 160.

A portion of the inner surface 178 defines a funnel 186 that forms at least a portion of the central channel 180. For example, a portion of the central channel 180 is "funnel shaped" or "frusto-conically shaped. As shown in FIG. 4, the funnel 186 extends from the second opening 184 towards the first opening 182. The funnel 186 does not reach the first end 172 of the alignment tool 170. However, in other implementations, the funnel extends across the entire alignment tool and its central channel. The wide end of the funnel 186 coincides with the second opening 184 of the central channel 180. The funnel 186 narrows radially as it extends towards the first end 172 of the alignment tool 170. Specifically, the inner surface 178 narrows from the second end 174 towards the first end 172, defining the funnel 186 of the central channel 180.

The alignment tool 170 further includes a flange 188 extending radially from the first end 172 of the alignment tool 170. The flange 188 includes an outer support surface 190 extending substantially perpendicularly from the outer surface 176 of the alignment tool 170. The outer support surface 190 is configured to engage with the second portion 144 to support the alignment tool 170 within the opening 154. In some implementations, the flange defines one or more openings each for receiving a fastener engageable with the second portion of the moving platform.

The alignment tool 170 further includes a shoulder 192 defined by the inner surface 178. In particular, the shoulder 192 is a portion of the inner surface 178 extending substantially perpendicularly to the longitudinal axis 171. The shoulder 192 is adjacent to the first opening 182 of the central channel 180. The shoulder 192 is an annular surface extending around the longitudinal axis 171 adjacent to the first end 172 of the alignment tool 170. The shoulder 192 is configured to support and engage with the second end 24 of the sleeve 14 as further described herein. In other implementations, the shoulder coincides with the first end of the alignment tool (i.e., not recessed into the central channel).

Figure 7A:
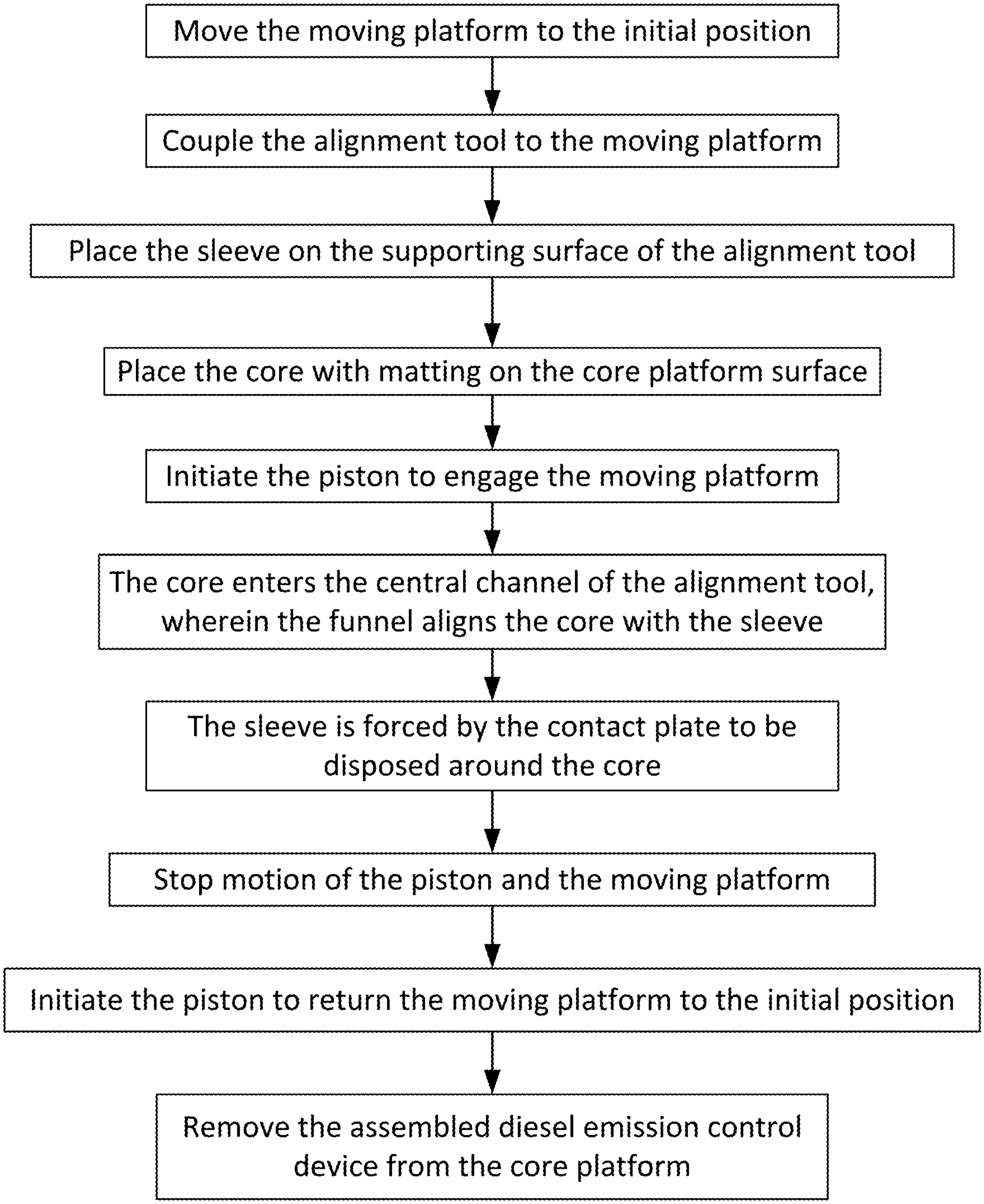
FIG. 7A shows a flowchart for a method of installing a sleeve onto a core of a DECD, according to one implementation.

A method for installing a sleeve over a core of a DECD is disclosed, as shown in FIG. 7A, further described herein. As shown in FIG. 3B, to start an assembly process for a diesel emission control device (DECD), the moving platform 140 is disposed in the initial position. The core 12 (with optional matting 16) is placed on the core platform surface 162 of the core platform 160. The sleeve 14 is placed in the space 148 of the moving platform 140. The first end 22 of the sleeve 14 is adjacent to the contact surface 152 of the contact plate 150. The second end 24 of the sleeve 14 sits on the alignment tool 170. Specifically, the second end 24 of the sleeve 14 sits on the shoulder 192 of the alignment tool 170. The core 12 and the sleeve 14 are substantially aligned with each other along the longitudinal axis 101 of the system 100.

The hydraulic power system 120 activates the piston 112 to engage the moving platform 140 and move the moving platform 140 towards the core platform 160. For example, a user may engage with the user interface 136 to cause the controller 130 to initiate movement of the piston 112.

Movement of the moving platform 140 towards the core platform 160 forces the core 12 into the central channel 180 of the alignment tool 170. The core 12 remains longitudinally stationary during installation. That is, the core platform 160 is stationary while the moving platform 140 moves towards the core platform 160. The core 12 enters the second opening 184 of the funnel 186 and moves through the central channel 180. Movement of the moving platform 140 and the alignment tool 170 thereon longitudinally aligns the core 12 with the sleeve 14 via the funnel 186 of the alignment tool 170.

Once the moving platform 140 moves a sufficient distance so that the sleeve 14 and the first opening 182 of the central channel 180 reaches the core 12, the core 12 and the sleeve 14 are completely aligned for installation and assembly. The moving platform 140 continues moving towards the core platform 160, wherein the core platform 160 extends through the central channel 180 of the alignment tool 170 and through the sleeve 14.

FIG. 3C shows the moving platform 140 in an installed or second position wherein the DECD 10 is fully assembled. The sleeve 14 is disposed around the core 12 and the matting 16, forming the DECD 10. The piston 112 and the moving platform 140 thereon are deactivated when the sleeve 14 is disposed around the core 12. For example, a user may stop movement of the moving platform 140, or the controller 130 may stop the movement according to a set of instructions. In other implementations, the piston is stopped when the alignment tool abuts a portion of the core platform, stopping motion of the moving platform. Once the DECD 10 is assembled, the DECD 10 can be removed from the space 148. The moving platform 140 can be moved back to the initial position to access the DECD 10 and/or for a subsequent assembly operation.

Disassembly and Removal

Figure 5A:
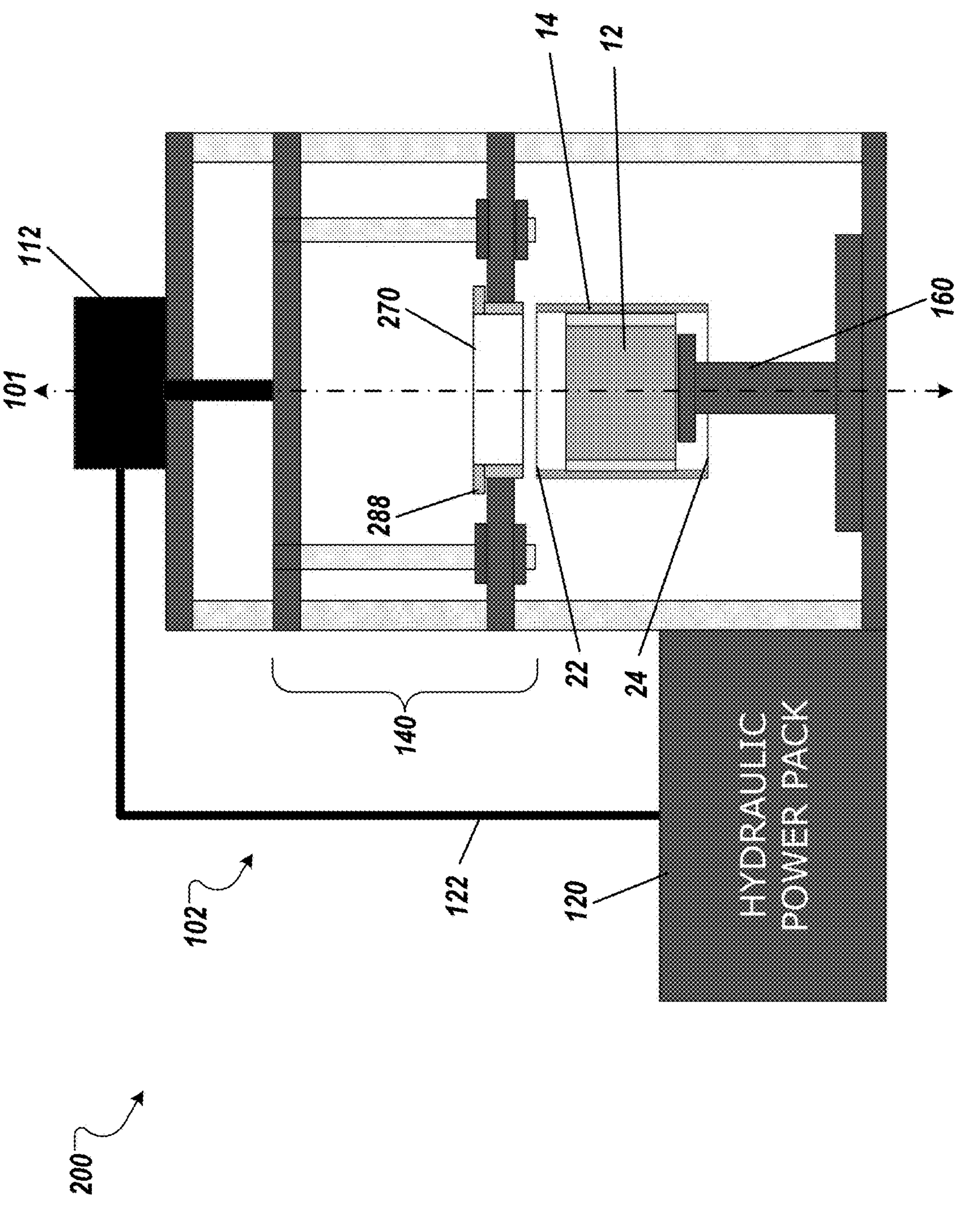
FIG. 5A shows the system of FIG. 2 with a removal tool, wherein the system is configured for removing a sleeve from a core of a DECD, according to one implementation.
Figure 5B:
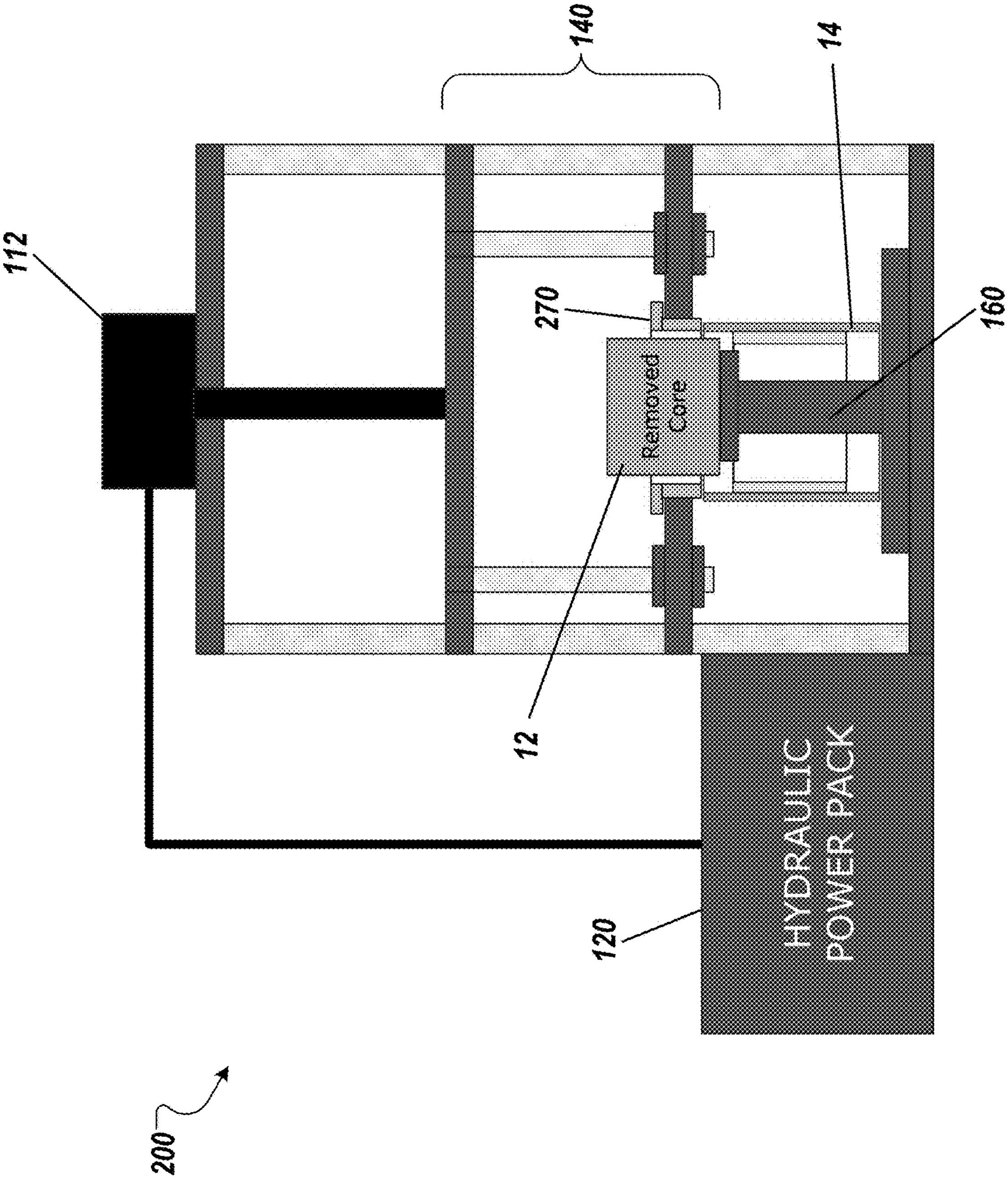
FIG. 5B shows the system of FIG. 5A with the sleeve removed from the core.

FIGS. 5A-5B shows a system 200 for removing a sleeve from a core of a diesel emission control device (DECD). For example, the system 200 is configured for removing the sleeve 14 from the core 12 of the DECD 10. The system 200 is substantially similar to the system 100 of FIGS. 3A-3C such that like reference numbers denote like elements.

FIGS. 5A-5B show a disassembly process for the DECD 10 wherein the sleeve 14 is removed from the core 12. As shown in FIG. 5B, the core 12 is separated from the sleeve 14 and the matting 16. However, in other implementations, the matting remains coupled to the core. To facilitate the disassembly process, the system 200 includes a removal tool 270, which is shown in further detail in FIG. 6. As shown in FIG. 5A, the removal tool 270 is couplable to the moving platform 140. In particular, the removal tool 270 is couplable to the second portion 144 of the moving platform 140 such that a portion of the removal tool 270 extends through the opening 154 of the second portion 144. In some implementations, the system includes one or more fasteners (e.g., screws, bolts, or spring-loaded tabs) to couple the removal tool to the second portion of the moving platform.

Figure 6:
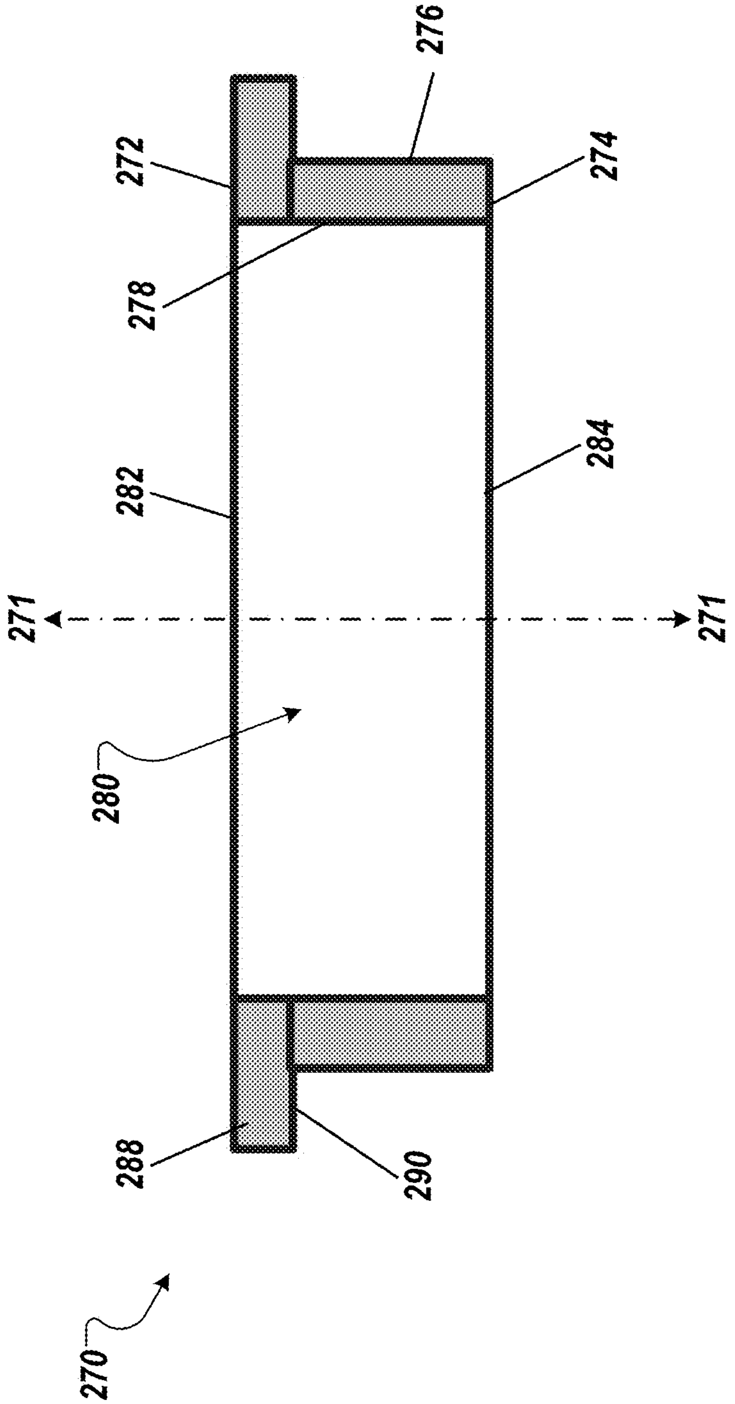
FIG. 6 shows a cross-sectional view of the removal tool shown in FIG. 5A.

As shown in FIG. 6, the removal tool 270 includes a first end 272 and a second end 274 opposite and spaced apart from the first end 272 along a longitudinal axis 271 of the removal tool 270. When the removal tool 270 is coupled to the moving platform 140, the longitudinal axis 271 of the removal tool 270 is coaxial (or at least parallel to) the longitudinal axis 101 of the press station 102.

The removal tool 270 includes an outer surface 276 and an inner surface 278 radially spaced apart from the outer surface 276. The inner surface 278 defines a central channel 280 of the removal tool 270. The central channel 280 extends from a first opening 282 defined by the first end 272 to a second opening 284 defined by the second end 274 of the removal tool 270. The central channel 280 has a diameter, shown in FIG. 6, that is less than the core platform diameter of the core platform 160. Furthermore, the diameter of the central channel 280 is equal to or substantially similar to the inner diameter of the core 12. Thus, the second end 274 of the removal tool 270 is configured to align with and engage with the first end 22 of the sleeve 14.

As shown in FIG. 6, the removal tool 270 is a generally annular body. The removal tool 270 further includes a flange 288 extending radially from the first end 272 of the removal tool 270 (e.g., the flange extending from the annular body of the removal tool). The flange 288 includes an outer support surface 290 extending substantially perpendicularly from the outer surface 276 of the removal tool 270. The outer support surface 290 is configured to engage with the second portion 144 to support the removal tool 270 within the opening 154.

Figure 7B:
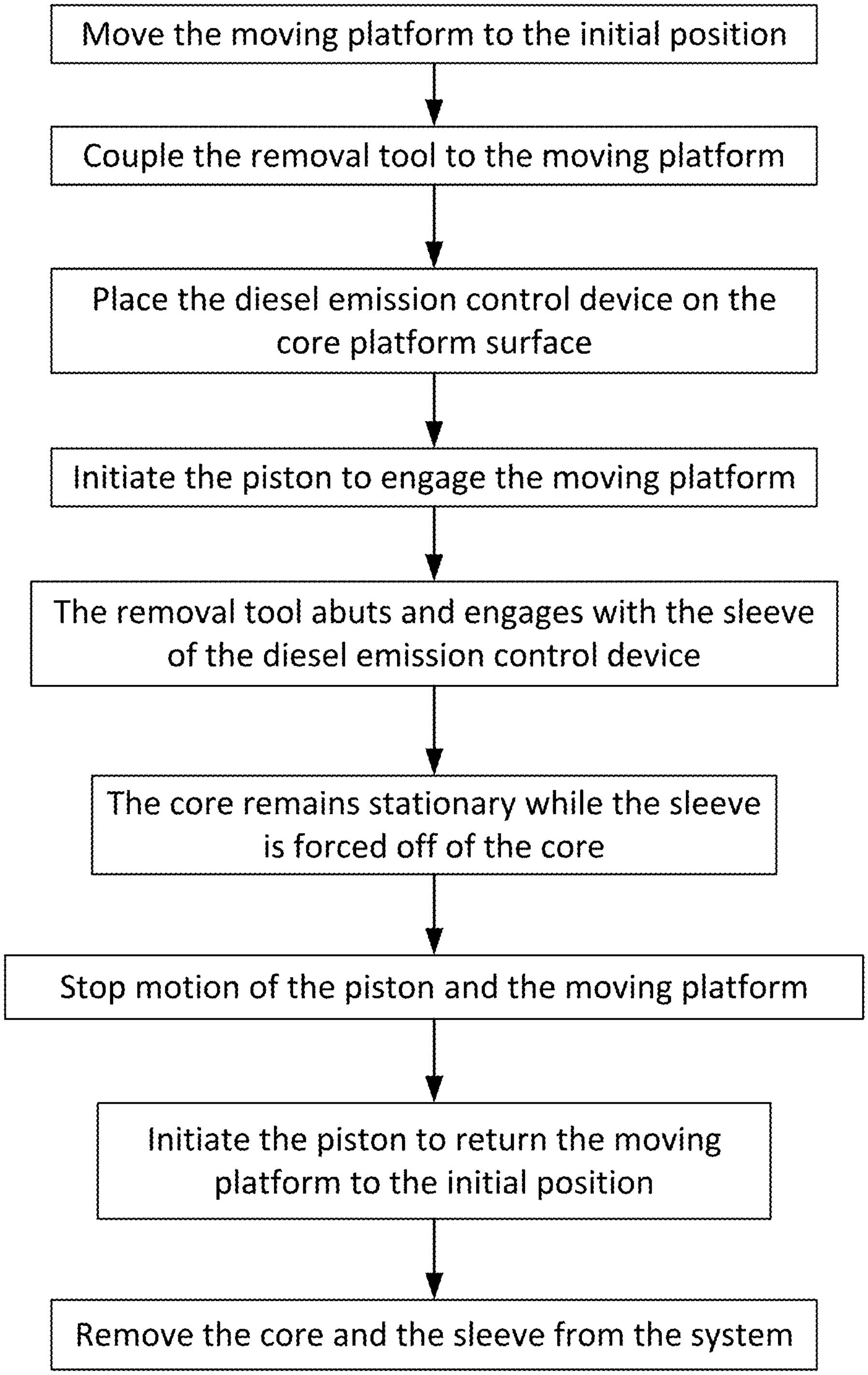
FIG. 7B shows a flowchart for a method of removing a sleeve from a core of a DECD, according to one implementation.

A method for removing a sleeve from a core of a DECD is disclosed, as shown in FIG. 7B, further described herein. As shown in FIG. 5A, the moving platform 140 is in an initial position. The disassembly process begins with the moving platform 140 in an initial position, as shown in FIG. 5A. The DECD 10 is placed on the core platform 160 such that the core 12 is supported by the core platform surface 162. The removal tool 270 coupled to the second portion 144 of the moving platform 140 is aligned with the sleeve 14. In particular, the second end 274 of the removal tool 270 is aligned with the first end 22 of the sleeve 14.

When the piston 112 is activated by the hydraulic power system 120 (e.g., by a user input), the piston 112 extends, engaging with the moving platform 140. The piston 112 moves the moving platform 140 towards the second end 108 of the frame 104, wherein the second end 274 of the removal tool 270 abuts the first end 22 of the sleeve 14. Because the core 12 is supported by the core platform 160, the core 12 remains stationary relative to the sleeve 14. Movement of the moving platform 140 and the removal tool 270 thereon forces the sleeve 14 to move relative to the core 12. The piston 112 continues moving the moving platform 140 until the sleeve 14 is free from the core 12.

Once the moving platform 140 moves from the initial position to a second position of a sufficient distance, the sleeve 14 is removed from the core 12, as shown in FIG. 5B. The matting 16 remains coupled to the sleeve 14. However, in other implementations, the matting remains coupled to the core. In the position shown in FIG. 5B, the core 12 remains on the core platform surface 162 and is disposed within the central channel 280 of the removal tool 270. The moving platform 140 can be moved back to the initial position, allowing the core 12 and/or the sleeve 14 to be removed from the system 200.

Examples

Example 1. A system for installing a sleeve onto a core of a diesel emission control device (DECD), the system comprising:

- a press station comprising a piston engageable with a moving platform along a longitudinal axis of the press station;
- a contact plate on a first portion of the moving platform, the contact plate comprising a contact surface configured to engage with a first end of the sleeve;
- an alignment tool coupled to a second portion of the moving platform, the alignment tool comprising an inner surface defining a central channel having a minimum diameter, wherein the alignment tool is configured to support and engage with a second end of the sleeve; and a core platform configured to support the core, the core platform being spaced apart from the moving platform along the longitudinal axis and having a diameter less than the minimum diameter of the central channel of the alignment tool, wherein engagement of the piston with the moving platform forces the core through the central channel of the alignment tool and into the sleeve.

Example 2. The system of Example 1, wherein the press station further comprises a frame along with the moving platform is slidably engaged.

Example 3. The system of Example 2, wherein the core platform is rigidly supported by the frame.

Example 4. The system of Example 1, further comprising a hydraulic power system in communication with the press station, the hydraulic power system being configured to activate or deactivate the piston to move the moving platform in a longitudinal direction.

Example 5. The system of Example 4, wherein the hydraulic power system further comprises a controller and a user interface for controlling activation of the piston.

Example 6. The system of Example 1, wherein the alignment tool comprises:

a first end and a second end opposite from the first end along a longitudinal axis of the alignment tool, the first end comprising a first opening of the central channel and the second end comprising a second opening of the central channel; and a funnel forming a portion of the central channel that is defined by the inner surface, the funnel extending from the second opening along a portion of the inner surface that narrows radially towards the first opening.

Example 7. The system of Example 6, wherein movement of the piston and the moving platform forces the core through the second opening of the central channel of the alignment tool and towards the first opening of the central channel, wherein the core is longitudinally aligned with the sleeve via the funnel of the central channel.

Example 8. The system of Example 7, wherein the core and the core platform remain longitudinally stationary during installation of the sleeve onto the core, while the sleeve and the alignment tool are moved between an initial position and an installed position longitudinally spaced apart from the initial position.

Example 9. The system of Example 1, wherein the second portion of the moving platform defines an opening within which the alignment tool is disposed, the alignment tool further comprising a flange disposed on the first end of the alignment tool, the flange configured to engage with the second portion of the moving platform to support the alignment tool.

Example 10. The system of Example 1, wherein the alignment tool comprises:

an annular support surface configured to support the second end of the sleeve, wherein the annular support surface is a shoulder defined along the inner surface.

Example 11. A method of installing a sleeve onto a core of a diesel emission control device (DECD), the method comprising:

providing the system of Example 1;

placing the core on the core platform;

placing the sleeve on the alignment tool between the contact plate and the alignment tool; and activating the piston to move the moving platform from an initial position longitudinally towards the core platform, wherein the core is forced through the central channel of the alignment tool and the sleeve is disposed around the core.

Example 12. The method of Example 11, wherein the system further comprises a frame, wherein moving the moving platform towards the core platform comprises sliding the moving platform longitudinally along the frame.

Example 13. The method of Example 11, further comprising: deactivating the press station when the sleeve is positioned on the core or when the moving platform reaches a stopping point.

Example 14. The method of Example 11, wherein moving the moving platform towards the core comprises aligning the sleeve and the core longitudinally via a funnel of the central channel of the alignment tool.

Example 15. The method of Example 11, wherein the core and the core platform remain longitudinally stationary during installation of the sleeve onto the core, while the sleeve and the alignment tool are moved between the initial position and an installed position longitudinally spaced apart from the initial position.

Example 16. A system for removing a sleeve from a core of a diesel emission control device (DECD), the system comprising:

a press station comprising a piston engageable with a moving platform along a longitudinal axis of the press station, the moving platform comprising a first portion and a second portion spaced apart longitudinally from the first portion, wherein the second portion of the moving platform defines an opening;

a removal tool coupled to the moving platform, the removal tool comprising an annular body extending through the opening of the second portion of the moving platform and a flange extending radially outwardly from a first end of the removal tool, the annular body comprising an inner surface defining a central channel extending from the first end to a second end of the removal tool, the central channel having a channel diameter equal to an inner diameter of the sleeve; and a core platform configured to support the core, the core platform being spaced apart from the moving platform along the longitudinal axis and having a diameter less than the channel diameter of the central channel of the removal tool, wherein engagement of the piston with the moving platform forces the second end of the removal tool to engage with the sleeve, removing the sleeve from the core.

Example 17. The system of Example 16, wherein the press station further comprises a frame along with the moving platform is slidably engaged, wherein the core platform is rigidly supported by the frame.

Example 18. The system of Example 16, further comprising a hydraulic power system in communication with the press station, the hydraulic power system being configured to activate or deactivate the piston to move the moving platform in a longitudinal direction.

Example 19. The system of Example 18, wherein the hydraulic power system further comprises a controller and a user interface for controlling activation of the piston.

Example 20. The system of Example 16, wherein movement of the piston and the moving platform forces the core through the central channel of the removal tool until the core is free from the sleeve and the sleeve is dispose around the core platform.

Example 21. The system of Example 16, wherein the core and the core platform remain longitudinally stationary during removal of the sleeve from the core, while the removal tool is moved between an initial position and a second position longitudinally spaced apart from the initial position.

Example 22. The system of Example 16, when the sleeve is removed from the core, a matting is removed from the core as well.

Example 23. A method of removing a sleeve from a core of a diesel emission control device (DECD), the method comprising:

- providing the system of Example 16;
- placing the diesel emission control device on the core platform;
- activating the piston to move the moving platform from an initial position longitudinally towards the core platform, wherein the removal tool engages with the sleeve to force the sleeve to move longitudinally relative to the core, wherein the core is forced through the central channel of the removal tool.

Example 24. The method of Example 23, further comprising: deactivating the press station when the sleeve is disposed around the core platform or when the moving platform reaches a stopping point.

Example 25. The method of Example 23, further comprising: removing the core from the core platform; moving the moving platform from a second position to the initial position; and removing the sleeve from the press station.

CONCLUSION

For purposes of this description, certain advantages and novel features of the aspects and configurations of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Features disclosed in this specification (including any accompanying claims, abstract, and drawings), and/or all of the steps of any method or process so disclosed, may be combined in any combination, except combinations where at least some of such features and/or steps are mutually exclusive. The claimed features extend to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms “a”, “an”, and “the” include plural referents unless the context clearly dictates otherwise. Ranges may be expressed herein as from “about” one particular value, and/or to “about” another particular value. When such a range is expressed, another aspect includes from the one particular value and/or to the other particular value. Similarly, when values are expressed as approximations, by use of the antecedent “about”, it will be understood that the particular value forms another aspect. It will be further understood that the endpoints of each of the ranges are significant both in relation to the other endpoint, and independently of the other endpoint. The terms “about” and “approximately” are defined as being “close to” as understood by one of ordinary skill in the art. In one non-limiting aspect the terms are defined to be within 10%. In another non-limiting aspect, the terms are defined to be within 5%. In still another non-limiting aspect, the terms are defined to be within 1%.

The terms “coupled”, “connected”, and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

Certain terminology is used in the following description for convenience only and is not limiting. The words “right”, “left”, “lower”, and “upper” designate direction in the drawings to which reference is made. The words “inner” and “outer” refer to directions toward and away from, respectively, the geometric center of the described feature or device. The words “distal” and “proximal” refer to directions taken in context of the item described and, with regard to the instruments herein described, are typically based on the perspective of the practitioner using such instrument, with “proximal” indicating a position closer to the practitioner and “distal” indicating a position further from the practitioner. The terminology includes the above-listed words, derivatives thereof, and words of similar import.

Throughout the description and claims of this specification, the word “comprise” and variations of the word, such as “comprising” and “comprises”, means “including but not limited to”, and is not intended to exclude, for example, other additives, components, integers or steps. “Exemplary” means “an example of” and is not intended to convey an indication of a preferred or ideal aspect. “Such as” is not used in a restrictive sense, but for explanatory purposes.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the form disclosed. Many modifications and variations will be apparent to those of ordinary skill in the art without departing from the scope and spirit of the present disclosure.

What is claimed is:

1. A system for installing a sleeve onto a core of a diesel emission control device (DECD), the system comprising:

a press station comprising a piston engageable with a moving platform along a longitudinal axis of the press station;

a contact plate on a first portion of the moving platform, the contact plate comprising a contact surface configured to engage with a first end of the sleeve;

an alignment tool coupled to a second portion of the moving platform, the alignment tool comprising an inner surface defining a central channel having a minimum diameter, wherein the alignment tool is configured to support and engage with a second end of the sleeve; and a core platform configured to support the core, the core platform being spaced apart from the moving platform along the longitudinal axis and having a diameter less than the minimum diameter of the central channel of the alignment tool, wherein engagement of the piston with the moving platform forces the core through the central channel of the alignment tool and into the sleeve.

2. The system of claim 1, wherein the press station further comprises a frame along with the moving platform is slidably engaged, wherein the core platform is rigidly supported by the frame.

3. The system of claim 1, further comprising a hydraulic power system in communication with the press station, the hydraulic power system being configured to activate or deactivate the piston to move the moving platform in a longitudinal direction, wherein the hydraulic power system further comprises a controller and a user interface for controlling activation of the piston.

4. The system of claim 1, wherein the alignment tool comprises:

a first end and a second end opposite from the first end along a longitudinal axis of the alignment tool, the first end comprising a first opening of the central channel and the second end comprising a second opening of the central channel; and a funnel forming a portion of the central channel that is defined by the inner surface, the funnel extending from the second opening along a portion of the inner surface that narrows radially towards the first opening.

5. The system of claim 4, wherein movement of the piston and the moving platform forces the core through the second opening of the central channel of the alignment tool and towards the first opening of the central channel, wherein the core is longitudinally aligned with the sleeve via the funnel of the central channel.

6. The system of claim 5, wherein the core and the core platform remain longitudinally stationary during installation of the sleeve onto the core, while the sleeve and the alignment tool are moved between an initial position and an installed position longitudinally spaced apart from the initial position.

7. The system of claim 1, wherein the second portion of the moving platform defines an opening within which the alignment tool is disposed, the alignment tool further comprising a flange disposed on the first end of the alignment tool, the flange configured to engage with the second portion of the moving platform to support the alignment tool.

8. The system of claim 1, wherein the alignment tool comprises:

an annular support surface configured to support the second end of the sleeve, wherein the annular support surface is a shoulder defined along the inner surface.

9. A method of installing a sleeve onto a core of a diesel emission control device (DECD), the method comprising:

providing the system of claim 1;

placing the core on the core platform;

placing the sleeve on the alignment tool between the contact plate and the alignment tool; and activating the piston to move the moving platform from an initial position longitudinally towards the core platform, wherein the core is forced through the central channel of the alignment tool and the sleeve is disposed around the core.

10. The method of claim 9, wherein the system further comprises a frame, wherein moving the moving platform towards the core platform comprises sliding the moving platform longitudinally along the frame.

11. The method of claim 9, further comprising: deactivating the press station when the sleeve is positioned on the core or when the moving platform reaches a stopping point.

12. The method of claim 9, wherein moving the moving platform towards the core comprises aligning the sleeve and the core longitudinally via a funnel of the central channel of the alignment tool.

13. The method of claim 9, wherein the core and the core platform remain longitudinally stationary during installation of the sleeve onto the core, while the sleeve and the alignment tool are moved between the initial position and an installed position longitudinally spaced apart from the initial position.

* * * * *